(12) United States Patent
Korcz et al.

(10) Patent No.: US 9,203,222 B2
(45) Date of Patent: Dec. 1, 2015

(54) WHILE IN USE WEATHERPROOF COVER FOR AN ELECTRICAL BOX

(71) Applicant: Hubbell Incorporated, Shelton, CT (US)

(72) Inventors: Krzysztof W. Korcz, Grainger, IN (US); Mahran H. Ayrton, South Bend, IN (US)

(73) Assignee: HUBBELL INCORPORATED, Shelton, CT (US)

( * ) Notice: Subject to any disclaimer, the term of this patent is extended or adjusted under 35 U.S.C. 154(b) by 178 days.

(21) Appl. No.: 13/797,055

(22) Filed: Mar. 12, 2013

(65) Prior Publication Data

US 2014/0262418 A1    Sep. 18, 2014

(51) Int. Cl.
| | |
|---|---|
| *H01J 5/00* | (2006.01) |
| *H02G 3/08* | (2006.01) |
| *H01J 15/00* | (2006.01) |
| *H05K 5/00* | (2006.01) |
| *H01R 13/46* | (2006.01) |
| *H02G 3/14* | (2006.01) |
| *H05K 5/03* | (2006.01) |
| *H01H 9/02* | (2006.01) |
| *H01H 13/04* | (2006.01) |
| *H01H 19/04* | (2006.01) |
| *H01H 21/04* | (2006.01) |
| *H01H 23/04* | (2006.01) |
| *A47B 49/00* | (2006.01) |

(52) U.S. Cl.
CPC .............. *H02G 3/088* (2013.01); *H02G 3/08* (2013.01); *H02G 3/081* (2013.01); *H02G 3/083* (2013.01); *H02G 3/085* (2013.01)

(58) Field of Classification Search
CPC ......... H02G 3/08; H02G 3/081; H02G 3/083; H02G 3/085
USPC ......... 174/50, 520, 66, 67, 53, 54, 57, 58, 60, 174/559; 312/326, 334.5
See application file for complete search history.

(56) References Cited

U.S. PATENT DOCUMENTS

| | | | | |
|---|---|---|---|---|
| 6,133,531 | A * | 10/2000 | Hayduke et al. | ................ 174/67 |
| 7,439,444 | B1 | 10/2008 | Maltby et al. | |
| 7,462,777 | B2 | 12/2008 | Dinh | |
| 7,476,806 | B2 | 1/2009 | Dinh | |
| 7,598,453 | B1 | 10/2009 | Shotey et al. | |
| 8,110,743 | B2 | 2/2012 | Drane | |
| 8,153,895 | B2 | 4/2012 | Drane | |
| 2002/0134568 | A1* | 9/2002 | Dinh et al. | ...................... 174/50 |
| 2010/0108374 | A1* | 5/2010 | Korcz et al. | ................... 174/520 |

* cited by examiner

*Primary Examiner* — Hoa C Nguyen
*Assistant Examiner* — Binh Tran
(74) *Attorney, Agent, or Firm* — Dickinson Wright PLLC (57) ABSTRACT

A weatherproof cover assembly for an electrical device such as an electrical outlet has a base and hinged cover that encloses the base when a cord or plug is connected to the electrical outlet. The base has a cord access opening to allow the cord to pass between the base and the cover when the cover is closed. An outer guard partially encloses the access opening in the base to inhibit water, dirt and insects from entering the internal cavity of the base. The outer guard has an open portion with a center axis that is misaligned with the axis of the access opening to form a diverging path through the open portion of the guard and the access opening in the base. The open portion in the guard has a closure member that can move between a closed position when not in use and an open position to allow a cord to pass through the guard to the access opening in the base.

23 Claims, 6 Drawing Sheets

WHILE IN USE WEATHERPROOF COVER FOR AN ELECTRICAL BOX

FIELD OF THE INVENTION

The present invention is directed to a cover and electrical box assembly for mounting to a support structure where the cover has a closable guard to inhibit insects from entering the cover. The present invention is particularly directed to a multidirectional weatherproof cover for use with an electrical box and electrical wiring device that can be mounted in a vertical or horizontal orientation.

BACKGROUND OF THE INVENTION

Electrical boxes are mounted in various locations and positions depending on the particular application. Electrical boxes that are mounted outside and exposed to the weather require suitable shielding to protect the electrical device and electrical plugs and cords from the weather and particularly rain. Therefore, electrical outlet boxes mounted outside typically have one or more covers to close around the electrical device and the electrical cords.

Although building codes may vary between areas, most codes require the cover to be self-closing so that cover will automatically close around the electrical device when released. The cover is either spring biased or gravity operated. The gravity operated covers are often preferred since they eliminate additional parts and springs.

The gravity operated devices require the hinge to be located along a top portion of the body or mounting face plate so that the cover will pivot downwardly to a closed position by the weight of the cover. The body of the assembly is often constructed to have a removable face plate for attaching to the electrical device or mating with an electrical device. The removable face plate can be replaced with another face plate having an opening oriented to accommodate the electrical device so that the cover is oriented to close by the weight of the cover.

U.S. Pat. No. 7,439,444 to Maltby et al. discloses a while in use cover device having a base and a hinged cover. The cover assembly does not have an outlet opening with a hinged guard to close the opening.

U.S. Pat. No. 7,462,777 to Dinh discloses a weatherproof electrical box having two perpendicular hinge assemblies for pivoting the cover in two different directions. The electrical box has a shelf for supporting an adapter plate which supports the electrical device.

U.S. Pat. No. 7,476,806 to Dinh discloses a recessed while in use electrical box assembly. The electrical box assembly has a hinged cover with an outlet on one side for allowing the cord to exit the cover. The electrical box has an outwardly extending flange with cord hooks.

U.S. Pat. No. 7,598,453 to Shotey et al. discloses an electrical box cover having a hinge that is able to pivot in two different directions.

U.S. Pat. No. 8,110,743 to Drane and assigned to Thomas & Betts discloses an electrical box cover with an insect guard. The base of the electrical box has a notch formed therein for receiving a flexible guard having an opening for receiving the cord. The guard is a flexible member that is adhesively attached to the base and includes a plurality of slots to allow the cord to pass through the guard. The slots form flexible tabs that deflect when the cord is inserted.

U.S. Pat. No. 8,153,895 to Drane discloses a while in use cover assembly with an insertable hinge pin. The cover assembly has a base and cover coupled together by the hinge pin. The hinge pin has an outwardly extending locking rib adjacent the head that engages the edge of the hinge pin aperture in the cover.

Another example of a weatherproof cover assembly is disclosed in U.S. Pat. No. 7,410,372 to Johnson et al. This cover assembly includes a base or face plate attached to the wiring device and snapped to a bottom side of a body member. A cover is hinged to the body to enclose the electrical device and the wires. Another example of a cover assembly having a removable plate is disclosed in U.S. Pat. No. 5,280,135 to Berlin. In this device, one removable plate can be replaced with a different plate where each plate has a different shaped opening to accommodate different electrical devices.

Another construction of cover assemblies that can be mounted in different orientations has a hinge member on two adjacent sides of the body and two adjacent sides of the cover. The body and cover can be oriented in the selected horizontal or vertical position and the appropriate members are coupled together. The hinge members that are not being used can be removed or are positioned to be inactive. Examples of this type of cover are disclosed in U.S. Pat. No. 6,891,104 to Dinh, U.S. Pat. No. 6,987,225 to Shotey, U.S. Pat. No. 4,874,906 to Shotey and U.S. Pat. No. 4,803,307 to Shotey.

Another cover assembly is disclosed in U.S. Pat. No. 6,133,531 to Hayduke. This assembly includes a body portion and a hinged cover. The hinge is mounted on a corner between two adjacent sides of the cover and body so that the cover pivots along an axis that is diagonal with respect to the longitudinal dimension of the cover and body. The cover and body can be mounted in a horizontal or vertical orientation so that the cover will close by the weight of the cover. The outlet opening has a pair flexible seals that form a seal around the cord.

Another example of a while-in-use electrical box assembly is disclosed in U.S. Patent Publication No. 2007/0181328 to Dinh. The assembly includes a hinged cover and cord holder extension to hold the cord when the cover is open. Other cover assemblies are disclosed in U.S. Pat. No. 4,950,842 to Menning a, U.S. Pat. No. 4,381,063 to Leong, U.S. Pat. No. 5,228,584 to Williams, and U.S. Pat. No. 5,456,377 to Williams.

While these devices have been suitable for the intended use, there is a continuing need in the industry for improved weatherproof covers.

SUMMARY OF THE INVENTION

The present invention is directed to a weatherproof cover assembly adapted for mounting to an electrical box. In particular, the invention is directed to a weatherproof cover and electrical box assembly that can be mounted in different orientations and provide protection of the wiring device and cords within the cover assembly. The electrical box cover preferably has a cord opening with a closure.

The weatherproof cover of the invention is adapted for mounting in a vertical orientation and in a horizontal orientation depending on the intended use of the assembly. The weatherproof cover has a cord outlet to enable a cord hang in a generally downward direction when the weatherproof cover is mounted in either a horizontal or vertical orientation. The weatherproof cover has an outer chamber formed around a cord outlet of a main body of the base. The chamber has an outlet opening that is offset from the opening in the base.

The weatherproof cover assembly of the invention includes a base with a cord opening to allow a cord to exit the assembly when plugged into or connected to an electrical receptacle or outlet and to allow the cover to close over the cord. The cover of the assembly is able to close completely over the base when a cord is connected to the electrical receptacle.

One feature of the invention is to provide a weatherproof cover assembly having a base and a cover coupled to the base by a hinge. The base in one embodiment has a cord access opening to allow a cord to pass through the wall of the base and an outer guard overlying the access opening to limit water, dirt and insects from entering the cover assembly when in use and when not in use.

Another feature of the invention is to provide a weatherproof cover assembly having a cord hook in the outer guard to hold the cord in place.

A further feature of the invention is to provide a weatherproof cover assembly having an access opening forming a cord outlet and an outer guard spaced from the access opening with a movable closure or wasp guard that can close the opening in the outer guard to prevent water, dirt and insects for entering the assembly when not in use.

The weatherproof cover assembly of the invention has a base, a cover and an outer guard partially blocking a cord access opening in the base. The guard has a cord opening offset from the axis of the access opening in the base to form a tortuous or circuitous path for the cord to exit the assembly. The side opening in the outer guard requires the cord to bend at an angle away from the access opening in the base in order to pass through the cord opening in the outer guard. In one embodiment, the cord opening in the outer guard is oriented at an inclined angle and diagonal with respect to the side walls of the base so that a cord is able to hang in a generally downward direction when the assembly is oriented in either a horizontal or vertical position.

The weatherproof cover assembly of the invention has a base and cover that is hinged to the base by a hinge assembly. The hinge assembly has a hinge pin that is inserted through bores formed in hinge members formed with the base and the cover. The hinge pin has an annular recess that is able to receive a locking tab on a surface of the base or cover to prevent or resist separation of the hinge pin from the assembly.

The weatherproof cover assembly of the invention has a base and cover where the base has a cord access opening and an outer guard that at least partially obstructs the cord access opening. The guard has an open portion forming a cord outlet where the open portion is misaligned with the cord access opening so that a cord must bend in at least one direction between the cord access opening and the open portion of the guard. In one embodiment, the open portion of the guard is spaced laterally from the access opening in the base requiring a cord to bend while passing between the cord access opening and the open portion of the guard. The open portion of the guard can be formed at an angle next to a corner of the base so that the cord can hang downward when the cover assembly is mounted in a horizontal orientation and in a vertical orientation.

The various features of the invention are basically attained by providing a cover assembly for an electrical box, comprising a base configured for coupling to the electrical box. The base has a wall with a first cord access opening, an outer guard coupled to the wall and has a first portion extending from the wall next to the cord access opening. A second portion extends from the first portion and overlies the cord access opening. A movable closure member is coupled to the outer guard and is movable between an open position and a closed position to close the opening in the outer guard. A cover is hinged to the base and has a dimension to overlie the base and outer guard.

The various features of the invention are further attained by providing a cover assembly for an electrical box comprising a base adapted for coupling to the electrical box, where the base has a first wall defining an inner cavity. The first wall has a cord access opening. A second wall extends from the first wall next to the cord access opening and defines an outer chamber with a free end defining an opening in the second wall. A cord hook extends from a free end of the second wall. A closure is adapted for closing the cord access opening and is movable between an open position and a closed position. A cover is hinged to the base, where the cover has a dimension to mate with the first wall and second wall to close the internal cavity and the outer chamber.

The features of the invention are also attained by providing a cover assembly for an electrical box, comprising a base adapted for coupling to the electrical box, where the base has a wall with a cord access opening. An outer guard is coupled to the wall of the base. The outer guard has an outer wall with an end portion spaced outwardly from the cord access opening to block access to the cord access opening. An open side portion is oriented substantially perpendicular to the cord access opening to allow access to the cord access opening. A cover is hinged to the base and has a dimension to overlie the base and outer guard.

These and other objects, advantages and salient features of the invention will become apparent from the following detailed description of the invention and the annexed drawings which disclose various embodiments of the invention.

BRIEF DESCRIPTION OF THE DRAWINGS

The following is a brief description of the drawings in which.

DETAILED DESCRIPTION OF THE INVENTION

The present invention is directed to a cover assembly for an electrical box having an electrical wiring device. The invention is particularly directed to a weatherproof cover assembly for exterior use for enclosing an electrical wiring device. The cover assembly 10 of the invention is adapted for mounting in a vertical orientation or in a horizontal orientation depending on the intended use of the assembly.

Figure 1:
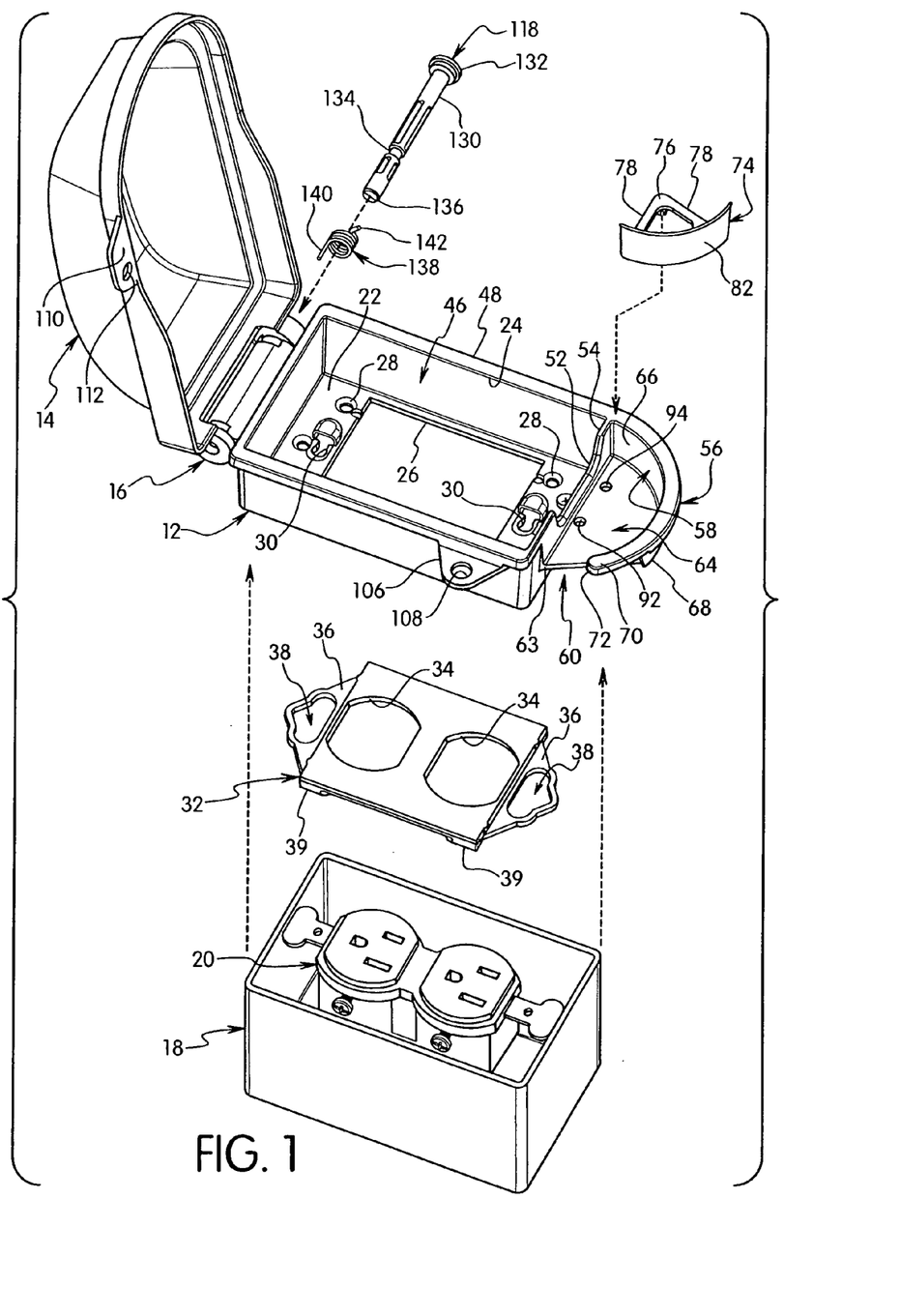
FIG. 1 is a perspective view of the electrical box and mounting assembly in a first embodiment of the invention showing the mounting bracket mounted in a first position.

The cover assembly 10 as shown in FIG. 1 includes a base 12 and a cover 14 hinged to the base by a hinge assembly 16. The cover 14 is pivotally connected to the base 12 to pivot between the open position shown in FIG. 1-5 and a closed position shown in FIGS. 7-10.

Base 12 is adapted for coupling to an electrical box 18 for supporting an electrical wiring device 20 such as a duplex receptacle as shown in FIG. 1. The electrical wiring device 20 can be a switch, GFCI outlet or other electrical device as known in the art. Electrical box 18 is typically a standard electrical box having an open front end with mounting tabs for mounting the electrical wiring device 20 and for coupling the base 12 to the electrical box.

The base 12 has a rear wall 22 and an open front side 24. The rear wall 22 has a central opening 26 to receive the electrical wiring device 22 or an adapter plate 32. The rear wall 22 has a plurality of apertures 28 and a keyhole-shaped slot 30 at each end on opposite sides of the central opening 26 for receiving mounting screws to attach the base 12 directly to screw holes in the electrical box 18 or to the wiring device 20 as known in the art of weatherproof covers. In the embodiment shown, the adapter plate 32 is provided having an opening 34 for receiving the face of the electrical wiring device 20. The opening 34 can have various shapes and dimensions to accommodate various electrical wiring devices such as a wall switch, GFCI receptacle, or decorator-style receptacle. The adapter plate 32 has a tab 36 at each longitudinal end with an aperture 38 for mating with the electrical box 18 and the bottom wall 22. In the embodiment shown, the adapter plate 32 is positioned between the base 12 and the electrical wiring device 20. Coupling tabs 39 are provided on the longitudinal side edges of the adapter plate 32 to couple the adapter plate 32 to the inner edges of the central opening 26 during assembly and mounting the assembly 10 to the electrical box 18. In alternative embodiments, the adapter plate 32 can be received within the opening 26 from the top side and held in place by the mounting screws or other coupling members.

Figures 2, 3:
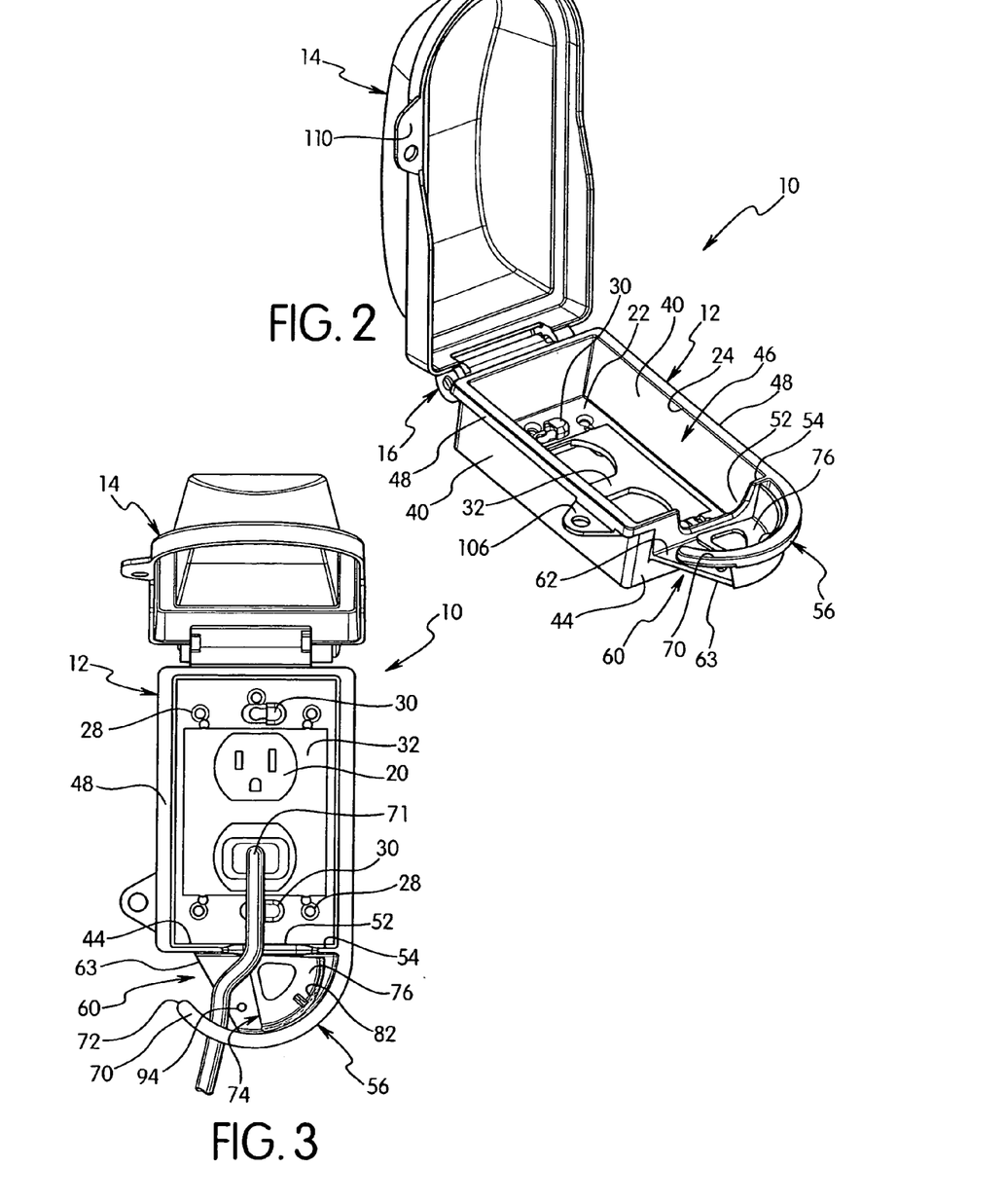
FIG. 2 is a perspective view of the cover assembly with the cover in the open position and the closure of the guard in the open position.
FIG. 3 is a top view of the cover assembly of FIG. 2.

The base 12 in the embodiment shown has a substantially rectangular configuration with a wall defined by longitudinal side walls 40, a first end wall 42, and a second end wall 44. Alternatively, the base can have a substantially square configuration with each of the side walls and end walls being substantially the same length or can have a substantially flat configuration. The side walls 40 and end walls 42 and 44 extend substantially perpendicular from the rear wall 22 and have a uniform height to define an internal cavity 46 of the base 12. The side walls 40 and the first end wall 42 have a top end with an outwardly extending flange 48 for mating with the cover 14. The first end wall 42 has a hinge member 50 for coupling with the cover 14. The second end wall 44 has a cord access opening 52 formed by a recess in the top edge 54. The recess extends from the top edge 54 towards the rear wall 22 and has a height and width to form the cord access opening 52 to allow an electrical cord to pass through the opening when the cover 14 is in the closed position. As shown in FIG. 3, the cord access opening 52 is positioned slightly off center from the center axis of the base 12 toward one side wall 40.

The base 12 includes an outer guard 56 spaced outwardly from the cord access opening 52 as shown in FIG. 1. The guard 56 has a wall 58 and a side opening 60 for allowing the cord to pass through. The side opening 60 in the embodiment shown can have an axis substantially parallel to the second end wall 44 and perpendicular to the axis of the cord access opening 52. In this manner, a cord extending from the electrical wiring device 20 passes through the cord access opening 52 in the end wall 44 and turns toward one side wall 40 to pass through the side opening 60.

The guard 56 has a bottom wall 62 extending from the second end wall 44 below the bottom edge of the cord access opening 52 to define an outer chamber 64. In the embodiment shown, the wall 58 of the guard 56 has a curved substantially arcuate shape extending from the base at the second end wall 44 and curving around the cord access opening 52. The wall 58 has a first portion 66 extending from the second end wall 44 and a second portion 68 that extends in a direction substantially parallel to the end wall 44. The second portion 68 extends a distance to overlie the cord access opening 52 and to block direct access to the cord access opening 52. A cord hook 70 extends from the top edge of the wall 68 and overlies a portion of the side opening 60. The side opening 60 is positioned opposite the first wall portion 66. As shown in FIG. 3, the cord hook 70 has an arcuate shape corresponding substantially to the arcuate shape of the wall 58. A free end 72 is spaced from the second end wall 44 a distance to allow an electrical cord to pass through the opening and hook to the bottom edge of the cord hook 70 within the side opening 60.

The opening 60 in the outer guard 56 is offset from the center axis of the cord access opening 52 so that the center axis of the opening 60 is not linearly aligned with the axis of the cord access opening 52. The bottom wall 62 in the embodiment shown has a side edge 63 extending at an inclined angle with respect to the end wall 44 so that the opening 60 in the outer guard 56 is oriented substantially diagonal with respect to the end wall 44 and the wall 58 of the outer guard 56. The opening 60 is positioned so that when the assembly is oriented in a horizontal position shown in FIG. 3, the cord 71 can pass through the cord access opening 52 and hang in a downward direction substantially parallel to the end wall 44. The assembly 10 can be oriented in a vertical position shown in FIG. 3 so the cord will pass through the cord access opening 52 and bend substantially at a right angle to pass through the opening 60 and hang downward substantially perpendicular to the end wall 44.

Figure 11:
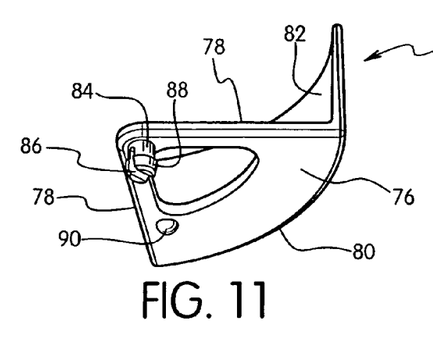
FIG. 11 is a bottom perspective view of the closure member in one embodiment of the invention.
Figure 12:
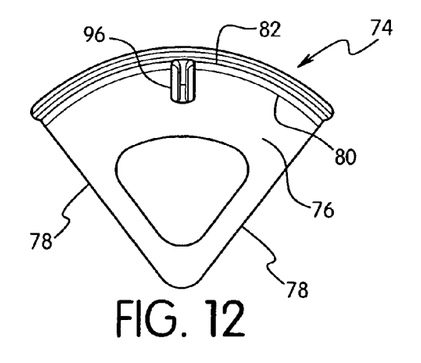
FIG. 12 is a top view of the closure member of FIG. 11.
Figure 13:
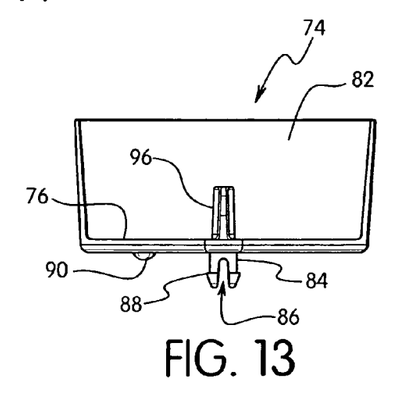
FIG. 13 is a front view of the closure member of FIG. 11.

The guard 56 includes a movable closure 74 that is movable between an open and closed position to close the opening 60 in the guard 56. The closure 74 in the embodiment shown is pivotally coupled to the outer guard 56 at the bottom wall 62 to pivot between the open and closed position. The closure 74 as shown in FIGS. 11-13 has a bottom wall portion 76 with angled side edges 78 and a curved end edge 80. A curved side wall 82 extends perpendicular from the bottom wall portion 76 along the curved end edge 80. The side wall 82 has a height corresponding substantially to the height of the wall 58 of the guard 56 and an arcuate length to close the side opening 60.

Figure 14:
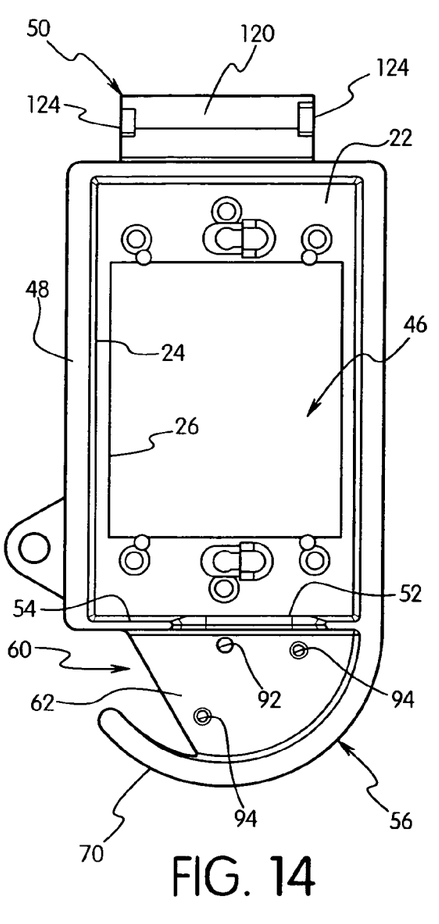
FIG. 14 is a top view of the base with the cover removed.

The bottom side of the bottom wall 76 of the closure 74 includes a pivot pin 84 having an axial slot 86 and an outwardly extending lip 88. The slot 86 in the pin 84 enables the pivot pin 84 to snap into an aperture 92 in the bottom wall 62 of the outer guard 56 with an interference fit. A catch member shown as a detent 90 extends from the bottom surface of the bottom wall 76 as shown in FIG. 13. As shown in FIG. 14, the bottom wall 62 of the guard 56 includes the aperture 92 for receiving the pivot pin 84 and is positioned to allow the closure 74 to pivot between the open and closed position with respect to the opening 60. The bottom wall 62 of the guard 56 also includes two recessed areas 94 to receive the detent 90 on the closure 74. The recessed areas 94 are oriented in the bottom wall 62 to receive the detent 90 in the closure 74 in the closed position and open position to selectively hold the closure 74 in the open and closed positions. A tab 96 on the inner face of the side wall 82 of the closure 74 is provided to allow the user to grip the closure 74 and pivot the closure between the open and closed positions.

Figures 4, 5:
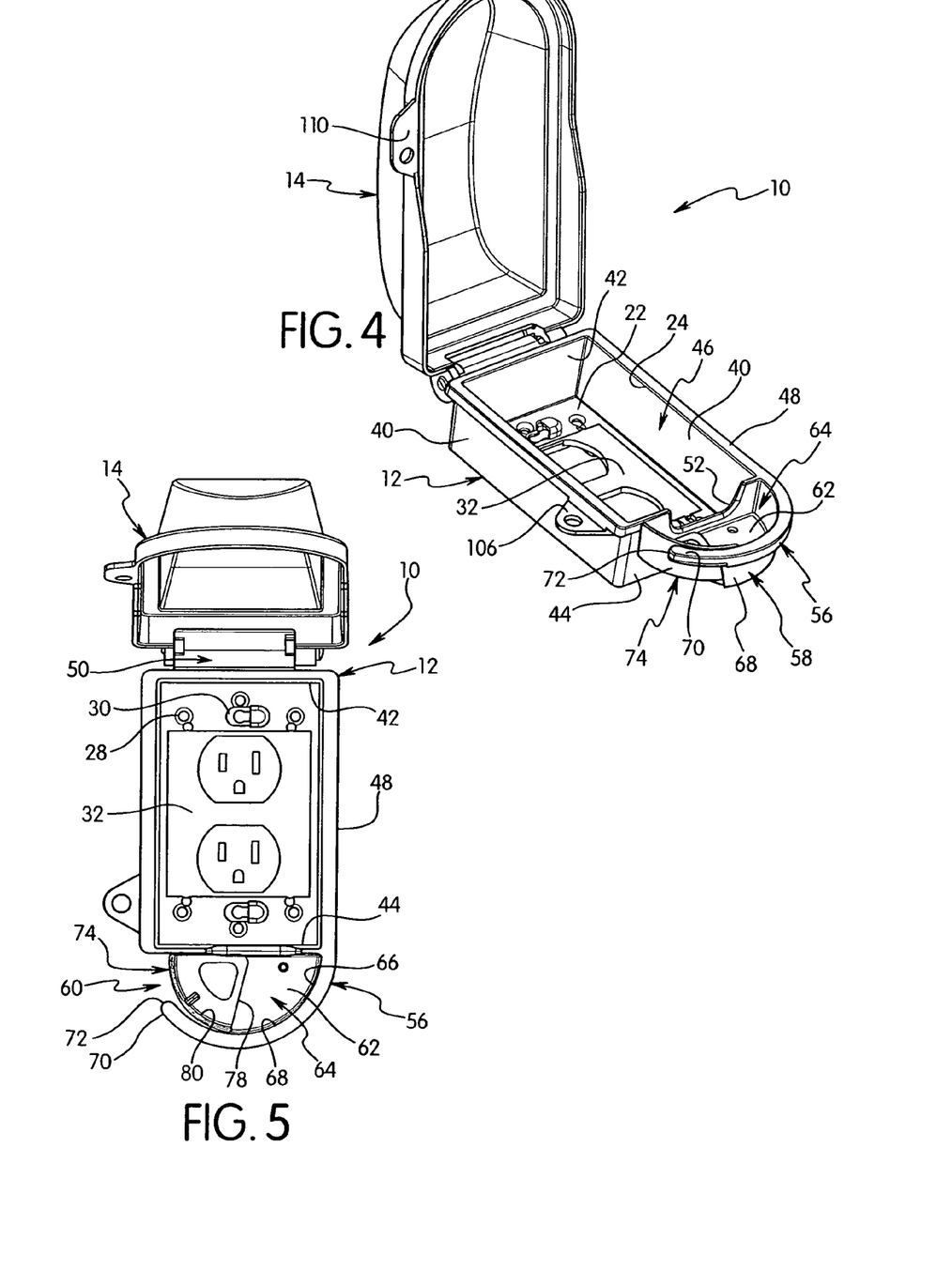
FIG. 4 is a perspective view of the cover assembly with the closure for the guard in the closed position.
FIG. 5 is top view of the cover assembly of FIG. 4.
Figure 6:
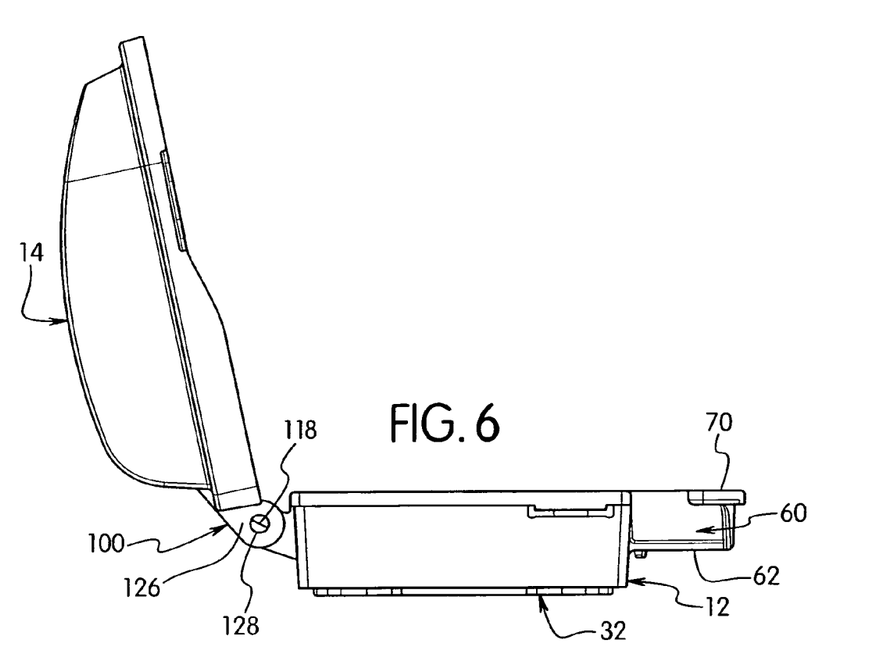
FIG. 6 is a side view of the cover assembly with the cover in the open position and the closure for the guard in the open position.

In the embodiment shown, the side wall 82 of the closure 74 has a shape complementing the shape of the wall 58 of the guard 56 to allow the closure 74 to pivot within the outer chamber 64 to the open position shown in FIG. 3 where the detent 90 snaps into one of the recesses 94 formed in the bottom wall 62 of the guard 56. As shown in FIGS. 4 and 5, the closure 74 is able to pivot to a closed position with the detent 90 snapped into the recess 94 to block the side opening 60 in the guard 56 when not in use. The closure 74 is able to pivot to the closed position to inhibit rain water and insects from entering the outer chamber 64. In alternative embodiments, the closure 74 can be mounted to the outer surface of the outer guard 56. In one embodiment, the bottom portion 76 is pivotally coupled to a bottom face of the bottom wall 62 of the guard 56 where the side wall 82 slides along an outer face of the wall 58.

Figure 7:
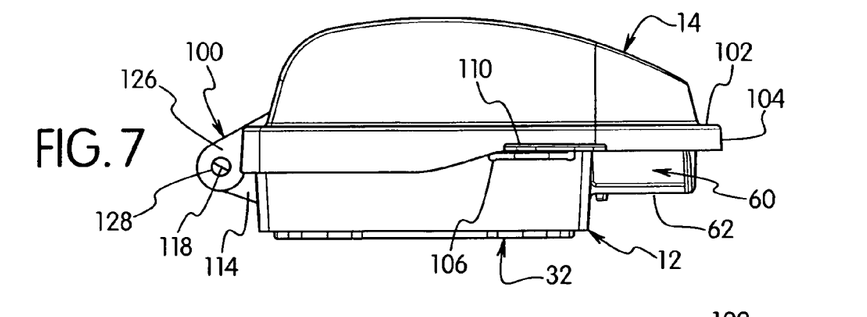
FIG. 7 is a side view of the cover assembly with the cover in the closed position.
Figure 8:
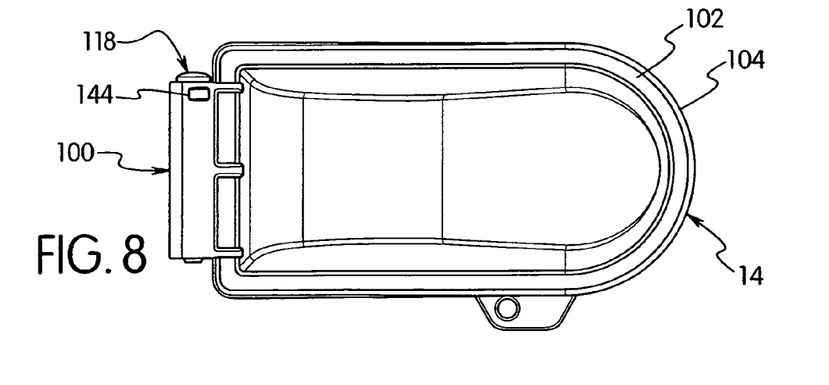
FIG. 8 is a top view of the cover assembly of FIG. 7.
Figure 9:
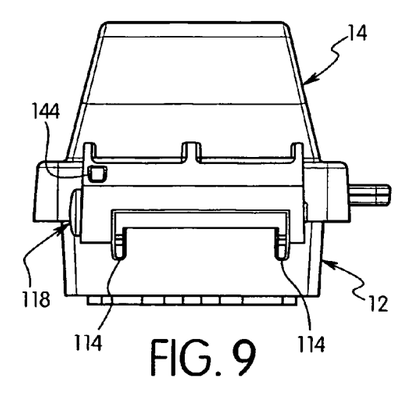
FIG. 9 is a rear view of the cover assembly of FIG. 8.
Figure 10:
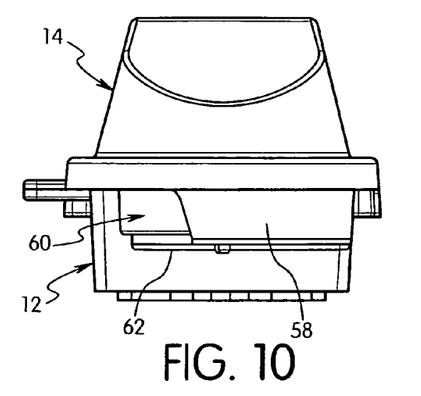
FIG. 10 is a front view of the cover assembly of FIG. 8.

The cover 14 has a hinge member 100 for coupling with the hinge member 50 of the base 12. In the embodiment shown, the cover 14 has an outwardly extending portion 102 forming a flange and a downwardly extending rim 104. The rim 104 has a dimension to overlie and surround the flange 48 of the base 12 and the guard 56 as shown in FIGS. 7 and 8 to provide a weatherproof closure for the base 12 and the guard 56. In the embodiment shown, the side wall 40 of the base 12 has a locking tab 106 with an aperture 108 and the cover 14 has a corresponding locking tab 110 with an aperture 112 for receiving a lock or other fastener to lock the cover in the closed position and prevent access to the electrical wiring device enclosed within the cover assembly 10.

Figure 15:
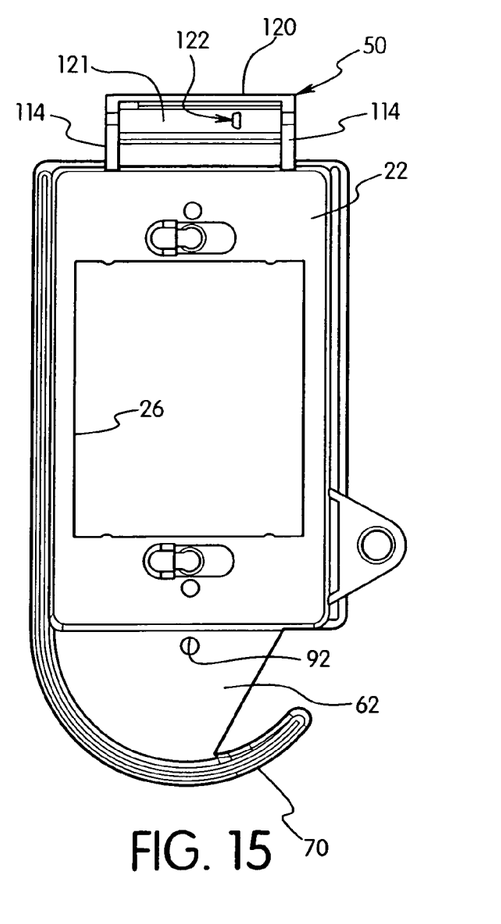
FIG. 15 is a bottom view of the base of FIG. 14.

In the embodiment shown, the hinge member 50 in the base 12 has a length extending across the first end wall 42 with axial end portions 114 having an axial bore for receiving a hinge pin 118. A curved top member 120 extends between the end portions 114 to define an open bottom area 121 on the rear side of the hinge member 50. As shown in FIG. 15, a detent 122 is provided on the inner surface of the top member 120 in the open bottom area 121 extending into the axial passage of the hinge member. A recessed portion 124 is provided on the top side of the end portions 114 and the top member 120. The hinge member 100 of the cover 14 has two lugs 126 that are spaced apart a distance to contact the outer faces of the end portions 114 of the hinge member of the base 12. Each lug 126 has a bore 128 to receive the hinge pin 118.

As shown in FIG. 1, the hinge pin 118 has a cylindrical body 130 with a head 132. An annular recess 134 is provided toward the distal end 136 to receive the detent 122 in the top member 120 of the hinge member 50. The hinge pin 118 slides through the bores in the hinge members 50, 100 so that the detent 122 snaps into the annular recess 134 to retain the hinge pin 118 coupled to the cover assembly 10 while allowing the cover 14 to pivot freely with respect to the base 12. A coil spring 138 is provided to spring bias the cover 14 in the closed position. The coil spring 138 has an axial bore to receive the hinge pin 118 as shown in FIG. 1. In the embodiment shown, the coil spring 138 is positioned in the recess area 124 between the hinge member of the base and the hinge member of the cover 14. The coil spring 138 has a first leg 140 that engages a surface in the recess 124 on the hinge member 50 of the base 12 and a second leg 142 received in an opening 144 in the top face of the hinge member 100 as shown in FIG. 8.

The cover assembly 10 of the invention is adapted for coupling to an electrical box or other housing containing an electrical wiring device and providing a weatherproof enclosure for the electrical wiring device. The cover assembly 10 can be mounted in a horizontal direction with the pivot axis of the cover oriented vertically or a vertical direction with the pivot axis of the cover oriented horizontally as needed where the cover 114 is spring biased to the closed position by the coil spring 138. The cover assembly 10 is positioned in the selected location for providing a weatherproof enclosure. In the embodiment shown, the electrical wiring device is a duplex receptacle forming an electrical outlet. A plug can be inserted into the openings in the electrical wiring device in the usual manner. The side walls of the base 12 and the dimension of the cover 114 allow the cover 14 to be closed when a plug is coupled to the duplex receptacle. The cord from the plug is able to pass through the cord access opening 52 in the end wall 44 to pass into the outer chamber 64 of the guard 56. The cord is then deflected about 90° from the axis of the cord access opening 52 to extend through the side opening 60 in the guard 56. The cord hook 70 holds the cord in position while the cover 14 is closed to enclose the open end of the base 12 and the guard 56 as shown in FIG. 7. When not in use, the closure 74 can be pivoted to the closed position shown in FIG. 5 to prevent rain, dust and insects from entering the cover assembly.

While various embodiments have been chosen to illustrate the invention, it will be understood by those skilled in the art that various changes and modifications can be made without departing from the scope of the invention as defined in the appended claims.

What is claimed is:

1. A cover assembly for an electrical box, comprising:
a base adapted for coupling to the electrical box, said base having a wall with a cord access opening;
an outer guard coupled to said wall and having an outer wall extending from said wall of said base to define an outer chamber between said access opening and said outer wall, said outer wall having an opening for a cord;
a movable closure member coupled to said outer guard by a pivot pin, said movable closure member being pivotable about said pivot pin relative to said outer guard between an open position spaced from said opening in said outer wall and a closed position blocking said opening in said outer wall to close said opening in said outer wall of said outer guard, said closure member being pivotally coupled to said outer guard in said open position and coupled to said outer guard in said closed position; and
a cover hinged to said base, said cover having a dimension to overlie said base and outer guard.

2. The cover assembly of claim 1, wherein
said outer guard has a bottom wall coupled to said wall of said base and an open top end, said bottom wall and outer wall of said outer guard defining said outer chamber; and
said closure member is pivotally coupled to said bottom wall to pivot between said open position and closed position.

3. The cover assembly of claim 2, wherein
said outer wall forms a continuous curved wall extending from said wall of said base and has a substantially concave inner surface and a substantially convex outer surface, and
where said movable closure member has a bottom portion pivotally coupled to said bottom wall about an axis perpendicular to a plane of said bottom wall and a curved side wall complementing said curved wall of said outer guard.

4. The cover assembly of claim 1, wherein
said closure member pivots about said pivot pin and slides to overlap said outer wall between said open position and said closed position to close said opening.

5. The cover assembly of claim 4, wherein
said outer guard has a bottom wall defining an outer chamber between said cord access opening and said base, and where said closure member is pivotally coupled to said bottom wall.

6. The cover assembly of claim 5, further comprising
a catch member to hold said closure member in said open position and to hold said closure member in said closed position.

7. The cover assembly of claim 6, wherein
said catch member comprises a first detent on one of said bottom wall of said outer guard or said movable closure and where the other of bottom wall of said outer guard or said closure member has a recess for receiving said detent to hold said closure member in said closed position.

8. The cover assembly of claim 6, wherein
said catch member comprises a first detent on a bottom portion of said movable closure, and
said bottom wall of said outer guard has a first recess for receiving said detent to hold said closure in an open position and a second recess for receiving said detent and holding said closure member in said closed position.

9. The cover assembly of claim 1, wherein
said base includes a first hinge member and said cover includes a second hinge member and a hinge pin coupling said first hinge member and second hinge member together,
at least one of said first hinge member or said second hinge member has a tab, and said hinge pin has an annular recess receiving said tab to couple said hinge pin to said base and cover.

10. A cover assembly for an electrical box, comprising:
a base adapted for coupling to the electrical box, said base having a wall defining an inner cavity, said wall having a cord access opening to said inner cavity, and an outer guard having a bottom wall, a side wall extending from said wall of said base defining an outer chamber, said side wall of said outer guard having a free end defining an opening in said outer guard;
a cord hook extending from said free end of said wall;
a closure coupled to said outer guard, said closure being pivotable relative to said outer guard between an open position with respect to said opening in said outer guard and a closed position blocking said opening in said outer guard, said closure member having a catch member to hold said closure member in said open position and to hold said closure member in said closed position; and
a cover hinged to said base, said cover having a dimension to mate with said first wall and second wall to close said internal cavity and said outer chamber.

11. The cover assembly of claim 10, wherein
said cord hook extends from a top edge of said wall of said outer guard toward said base and where said cord hook has a free end spaced from said base; and
said opening in said outer guard is spaced laterally from said access opening in said base.

12. The cover assembly of claim 10, wherein
said outer chamber has a bottom wall extending between said base and outer guard, and where said closure is pivotally coupled to said bottom wall whereby said closure member pivots about an axis perpendicular to said bottom wall of said outer guard.

13. The cover assembly of claim 10, wherein
said closure has a bottom portion pivotally coupled to said bottom wall of said outer chamber, and a side wall extending substantially perpendicular from said bottom portion.

14. The cover assembly of claim 13, wherein
said bottom portion of said closure pivots about an axis substantially perpendicular to said bottom portion and said bottom wall of said outer chamber.

15. The cover assembly of claim 10, wherein
said wall of said outer guard has a concave inner surface and said closure has a side wall complementing the shape of said concave inner surface, and
where said closure is pivotally mounted to pivot between the open position substantially adjacent said wall of said outer guard and the closed position to extend between the free end of the wall of said outer guard to said base.

16. A cover assembly for an electrical box, comprising:
a base adapted for coupling to the electrical box, said base having a wall with a cord access opening;
an outer guard coupled to said wall of said base, said outer guard having an outer wall with an end wall portion spaced outwardly from said cord access opening to limit access to said cord access opening, and said outer guard having an opening for accessing said cord access opening in said base;
a movable closure coupled to said cover assembly, wherein said closure slides relative to said opening in said outer guard between a first open position where said opening in said outer guard is open and a closed position blocking said opening in said outer guard, where said closure in the open position overlaps a portion of said outer wall of said outer guard, and where said closure is coupled to said cover assembly in said open position and said closed position;
a cover hinged to said base, said cover having a dimension to overlie said base and outer guard.

17. The cover assembly of claim 16, wherein said wall of said base comprises
a first end wall having a hinge member for coupling to said cover;
a first and a second side wall;
a second end wall opposite said first end wall, said cord access opening being provided in said second end wall, and
where said opening in said outer wall is spaced transversely from said cord access opening toward said first side wall.

18. The cover assembly of claim 17, wherein
said opening of said outer guard is oriented substantially perpendicular to said second end wall.

19. The cover assembly of claim 16, wherein
said closure is pivotably coupled to said outer guard and pivoting movement of said closure slides said closure to the open position to overlap said outer wall of said outer guard.

20. The cover assembly of claim 16, wherein
said closure has a bottom portion pivotally coupled to a bottom wall of said outer guard to pivot about a pivot axis substantially perpendicular to a plane of said bottom wall.

21. The cover assembly of claim 16, wherein
said outer wall of said outer guard has an arcuate shape, and said wall portion of said closure has an arcuate portion, said wall portion being concentric with said outer wall, where said outer wall and wall portion overlap one another when the closure is in the open position.

22. The cover assembly of claim 16, further comprising
a cord hook extending from said outer wall and overlying said opening portion and extending toward said wall of said base.

23. The cover assembly of claim 16, wherein
said base has a first hinge member, and said cover has a second hinge member coupled to said first hinge member by a hinge pin,
at least one of said first hinge member or second hinge member have a detent, and said hinge pin has an annular recess receiving said detent to couple said hinge pin to said hinge members.

\* \* \* \* \*